United States Patent [19]

Kempf

[11] 4,105,340
[45] Aug. 8, 1978

[54] OPTICAL COMPARATOR AND INSPECTION APPARATUS

[76] Inventor: Paul S. Kempf, 703 Stratford Ct., Del Mar, Calif. 92104

[21] Appl. No.: 706,676

[22] Filed: Jul. 19, 1976

Related U.S. Application Data

[60] Division of Ser. No. 568,866, Apr. 17, 1975, abandoned, which is a division of Ser. No. 190,187, Oct. 18, 1971, Pat. No. 3,888,593, which is a continuation-in-part of Ser. No. 63,180, Aug. 12, 1970, abandoned.

[51] Int. Cl.² ............................................. G01B 9/08
[52] U.S. Cl. ................................... 356/168; 356/71; 356/165
[58] Field of Search .................. 356/71, 164, 165, 166, 356/168, 167

[56] References Cited

U.S. PATENT DOCUMENTS

| 2,155,248 | 4/1939 | Adams et al. | 356/166 |
| 2,899,857 | 8/1959 | Rockaffellon | 356/166 |
| 3,112,354 | 11/1963 | Urias et al. | 356/168 |
| 3,339,076 | 8/1967 | Hilal | 356/168 |
| 3,376,782 | 4/1968 | Whitley et al. | 356/166 |

FOREIGN PATENT DOCUMENTS

| 87,748 | 7/1956 | Norway | 356/168 |
| 440,736 | 1/1968 | Switzerland | 356/168 |

*Primary Examiner*—John K. Corbin
*Assistant Examiner*—R.A. Rosenberger
*Attorney, Agent, or Firm*—Brown & Martin

[57] ABSTRACT

An optical comparator in which images of a master component and a sample component are inspected by comparison of the images that are projected in a moving, abutting, merging, mirror image, a limited area of the components being viewed in a scanning illumination at a controlled rate for full viewing coverage. The components are held in a sliding tray with means for rapidly changing the component to be inspected, whie maintaining precise alignment. A closely directed light source and efficient cooling device permits prolonged operation of the apparatus, and instant access to mark defective portions of the component is provided without interrupting viewing. The location of each defective portion is marked on a reference chart for use in a viewer which provides a composite image of the chart and component in proper registration for easy identification of the faults.

4 Claims, 22 Drawing Figures

OPTICAL COMPARATOR AND INSPECTION APPARATUS

CROSS REFERENCE TO RELATED APPLICATION

This is a division of application Ser. No. 568,866 filed Apr. 17, 1975, now abandoned; which was a division of Ser. No. 190,187 filed Oct. 18, 1971, now issued as U.S. Pat. No. 3,888,593 dated June 10, 1975; which was a continuation-in-part of application Ser. No. 63,180, filed Aug. 12, 1970, now abandoned.

BACKGROUND OF THE INVENTION

The inspection of complex components, such as electronic printed circuit boards, is a tedious operation requiring considerable observational skill. Apart from basic element by element checking, various techniques have been developed to accelerate the process. One such technique uses a blink system, in which images of a master component and a component being checked are alternated in a suitable display in quick succession. Any discrepancies between the two images tend to stand out due to an apparent blinking of the area of difference. Careful scrutiny is required and the blinking is very tiring to the operator.

Magnified images of the components have been projected to facilitate comparison, but extreme care in observation is necessary, and the high intensity lighting needed to project clear images causes heating problems. Also, in a projection system, it is dificult to mark a faulty element without upsetting image alignment, or shutting off the apparatus to avoid possible burning of the operator's fingers.

SUMMARY OF THE INVENTION

In the apparatus described herein, a master component, such as a printed circuit board, and a similar component to be inspected, are carried in a frame in precise alignment for projection of their two images in adjacent relation, by an opaque projection system, on a large viewing screen. The frame slides out of the projection unit for loading and unloading components, and has alignment adjusting means which maintains proper alignment of successive components. A closely controlled lighting system provides a clear image of a narrow band of each component, the frame being moved forward or backward at a controlled rate to scan the components. Controls for motion direction, speed and image focussing are provided at the operator's position. The images thus move in synchronization and are positioned one above the other, so that similar portions of each component can be closely compared, a small area at a time. An efficient cooling system permits prolonged operation of the apparatus and facilitates direct access to the component being checked for marking faulty elements. The operator can reach through a trap door with a marking device and see the actual marking operation on the viewing screen, without the need to pull out the frame or disturb the component alignment, and the image display is so arranged that the marking operation does not interfere with the display.

A grid reference at the viewing screen permits location of faults on a chart assigned to the particular component. After inspection, the component and its chart are placed in a viewer which superimposes the images, so that the faults are clearly located and identified.

The primary object of this invention, therefore, is to provide a new and improved optical comparator and inspection apparatus.

Another object of this invention is to provide a new and improved optical comparator apparatus in which large images of a master component and a component to be checked are projected in adjacent alignment and scanned over the components a small area at a time, at a controlled rate.

Another object of this invention is to provide a new and improved optical comparator apparatus in which faulty elements of a component can be marked directly by the operator while the component remains in viewing position.

A further object of this invention is to provide a new and improved optical comparator apparatus, in which components to be checked are easily and quickly inserted and removed without disturbing image alignment.

Other objects and many advantages of this invention will become more apparent upon a reading of the following detailed description and an examination of the drawings, wherein like reference numerals designate like parts throughout and in which:

DESCRIPTION OF THE PREFERRED EMBODIMENT

Figure 1:
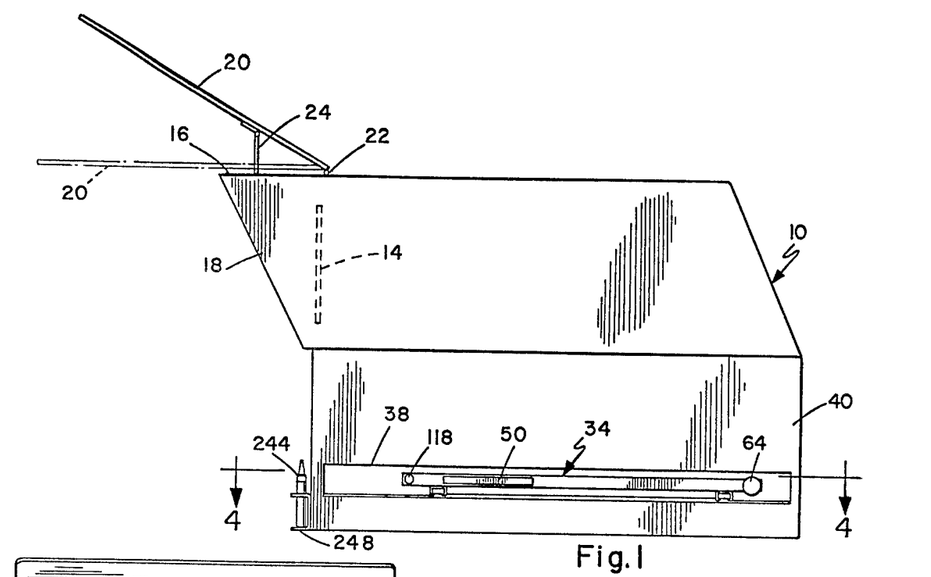
FIG. 1 is a side elevation view of the optical comparator unit.

The optical comparator is completely contained in a casing 10, having a front panel 12 with a back projection type viewing screen 14 inset in the upper portion, the casing having a hood 16 with sides 18 which extend forwardly to shield the screen. For added shielding, from overhead lights, a hood extension 20 is attached to the top of the casing by a hinge 22 and normally rests flat on the casing to extend beyond hood 16, as in the broken line position in FIG. 1. When not in use the hood extension 20 can be propped up by a leg 24 hinged on the underside thereof. The exact configuration of the casing is not critical and may vary for the purpose of appearance.

In the lower portion of casing 10 are two spaced parallel rails 26 supporting a carriage 28, which comprises a pair of longitudinal slide members 30 connected by cross rails 32, the slide members being slidable along the rails 26. On top of carriage 28 is a frame 34, having a pair of cross slide members 36 which slide on cross rails 32. The rail and slide member combinations are preferably roller type elements similar to drawer slides, for smooth action. Frame 34 is manually operated and can be pulled out through an elongated slot 38 in one side 40 of the casing 10. The carriage 28 is driven by a motor 42, having a friction drive roller 44 which rides on one slide member 30, the motor having speed and reversing controls described in more detail hereinafter.

Frame 34 has a pair of side bars 46 and 48 fixed to opposite ends of slide members 36 to form a rigid rectangular frame. The outside bar 46, which is normally exposed in slot 38, is provided with a handle 50 to facilitate sliding the frame in and out of the casing. At opposite ends of side bars 46 and 48 are threaded traverse rods 52 and 54, journalled in the side bars and extending parallel to slide members 36. On the inside ends of the traverse rods 52 and 54 are bevel gears 58, the two rods being interconnected by a connecting shaft 58 rotatably mounted in bearings 60 on side bar 48 and having bevel gears 56. Traverse rod 52 projects outwardly from side bar 46 and is fitted with a knob 64, so that both traverse rods can be rotated in synchronization. The traverse rod 52 is oppositely threaded from the center out and a pair of traverse blocks 66 and 68 are threaded on the opposite ends. Traverse rod 54 is similarly threaded and carries a pair of traverse blocks 70 and 72. Fixed between the traverse blocks 66 and 70 is a channelled track 74, and fixed between traverse blocks 68 and 72 is a similar track 76. When knob 64 is turned, the tracks 74 and 76 are moved toward or away from each other in parallel relation.

Slidably mounted in tracks 74 and 76 are two pairs of clamp blocks 78 and 80, having inwardly opposed fingers 82 to grip the corners of a rectangular master component 84, which rests on top of the tracks. Each track has a longitudinal slot 86 and the clamp blocks are secured from below by any suitable screw or clamp means. As shown, the component 84 is a simple rectangular board used for a printed circuit, but the clamp blocks could be arranged to hold any other configuration. In normal use, the master component is fixed at one end of the frame between the tracks which are adjusted to the proper width by means of knob 64, and is left in that position until all sample components of that type have been checked. A sample component 88 rests on tracks 74 and 76 at the other end of frame 34 and is held between stop blocks 90 and 92 and adjustable clamp blocks 94 and 96. Stop blocks 90 and 92 have inwardly opposed spring fingers 100, against which the sample component is held by fingers 102 on the clamp blocks 94 and 96.

Figure 5:
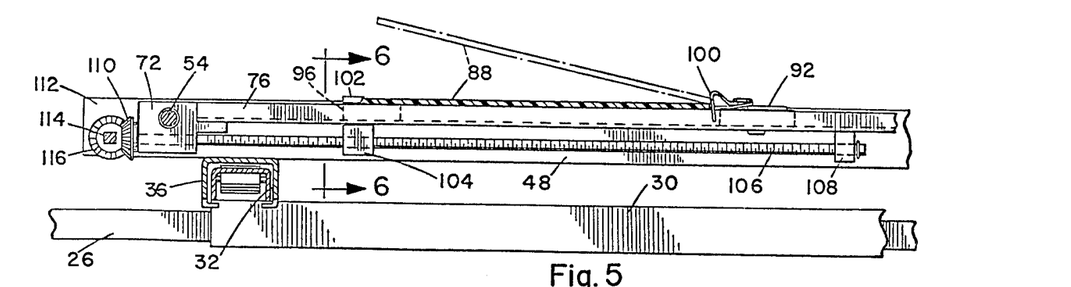
FIG. 5 is an enlarged sectional view taken on line 5—5 of FIG. 4.
Figure 6:
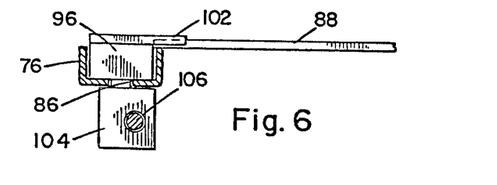
FIG. 6 is a sectional view taken on line 6—6 of FIG. 5.

Below track 74 is a nut 104 fixed to clamp block 94 through slot 86, the nut running on a threaded rod 106 supported between traverse block 70 and a bearing 108 under the center portion of the track. A similar nut and threaded rod adjustment means is coupled to clamp block 96 below track 76. The threaded rods 106 extend through the supporting traverse blocks 70 and 72 and are fitted with bevel gears 110. The traverse blocks have forwardly extending flanges 112, through which passes a shaft 114, journaled at its ends in side bars 46 and 48. Shaft 114 is shown as being square in cross section, but could be suitably splined, and at each transverse block 70 and 72 is a bevel gear 116 meshing with the adjacent bevel gear 110. Bevel gears 116 rotate with shaft 114 but are slidable thereon to allow for adjustment in the spacing of the tracks. Shaft 114 projects from side bar 46 and is provided with a knob 118, by which the clamp blocks 94 and 96 can be simultaneously adjusted to hold the sample component 88. Spring fingers 100 allow the sample component to be inserted and removed, as in the broken line position in FIG. 5, without disturbing the positioning of the clamps.

Figure 11:
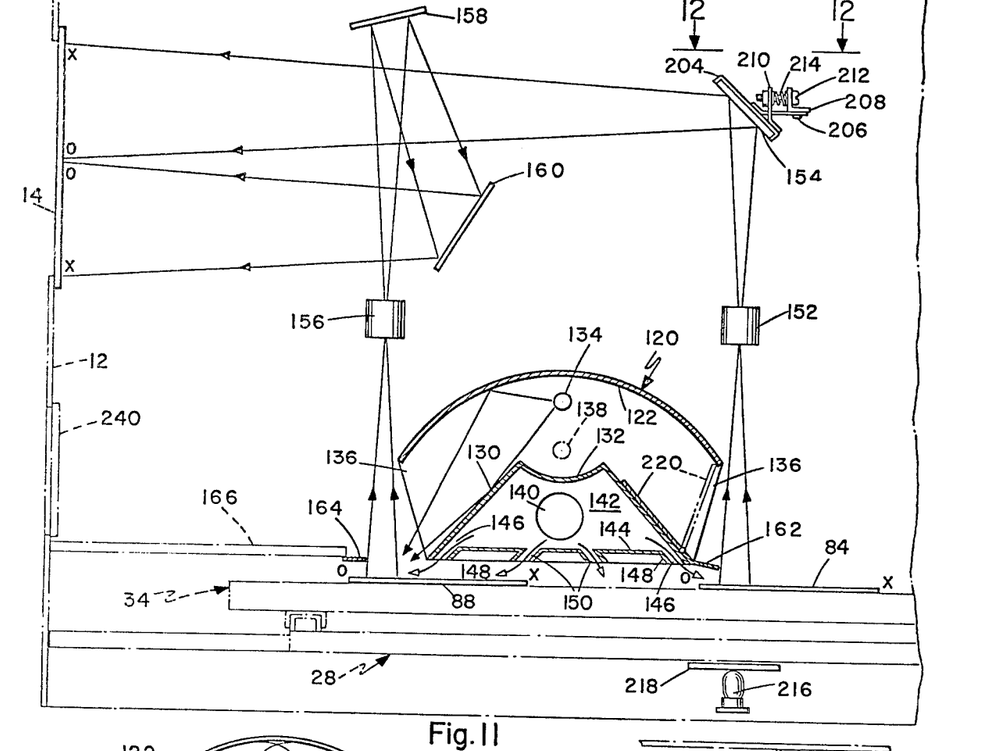
FIG. 11 is a diagrammatic side elevation view of the optical system, with associated structure shown in section and broken line.
Figure 13:
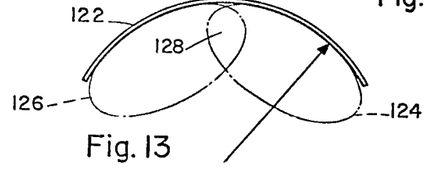
FIG. 13 is a diagram of the light reflector configuration.

Mounted directly above frame 34, substantially at the center of its range of travel, is a lamp house 120. Ideally the light should be concentrated on similar narrow transverse strips of the two components and the arrangement shown has been found particularly effective. The top of the lamp house comprises a reflector 122 of cylindrical form extending across the full width of the carriage structure. It is well known that light from a source at one focal point of an elliptical reflector will be concentrated at the other focal point of the ellipse. As shown in FIG. 13, the reflector 122 in arcuate cross section is closely similar to the section of a pair of overlapping ellipses 124 and 126 with a common focal point 138, the arcuate form being simple to manufacture. Spaced below reflector 122 is a secondary reflector 130 of inverted V configuration, the apex of which has an arcuately concave portion 32. A tubular lamp 134 is mounted at the effective common focal point of reflector 120 and the center of radius of concave portion 132 is spaced below the lamp, so that light reflected from the concave portion will pass to the side of the lamp and strike the primary reflector. The inclined walls of the secondary reflector 130 subtend an angle of less than 90 degrees, so that light is reflected at a shallow angle, as in FIG. 11. A large percentage of the light is thus concentrated through the open sides 136 of the lamp house, to the areas of the components immediately adjacent to the lamp house. If additional light is needed, a second lamp 138 may be mounted above the concave portion 132, as indicated in broken line in FIG. 11.

To provide adequate cooling, a duct 140 from a suitable blower, not shown, is led into the plenum chamber 142 formed under the secondary reflector 130. The plenum chamber has a bottom panel 144 with slotted outlets 146 formed by flanges 148 spaced from and parallel to the lower edges of the inclined walls. Additional slotted outlets 150 are provided near the center to increase airflow. It has been found that this type of airflow, directed downwardly and outwardly in a thin sheet across the surface of each component, has the greatest cooling effect and allows prolonged operation without excess heating.

Mounted above the illuminated portion of the master component 84 is a wide angle projection lens 152, above which is an inclined mirror 154 to reflect the image to the upper portion of screen 14. Above the illuminated portion of sample component 88 is a similar lens 156, directing light to a first mirror 158 above the optical path of the master component image. First mirror 158 is inclined to direct light downwardly to a second mirror 160, which directs the image to the lower portion of the screen 14. By using a single mirror for one image and two mirrors for the other, an upright image of the sample component is seen with an inverted and effectively mirror image (reverted image) of the master component. As the carriage 28 is moved, the two images converge or diverge with a flowing motion, depending on the direction of motion. The corresponding ends of the components and their images are marked O and X for reference. To obtain a sharp line of separation between the images and avoid confusing overlap, a shield or stop 162 is fixed to the lower rear edge of secondary reflector 130. Another stop 164 is secured to a platform 166 fixed in the forward portion of the casing immediately above the frame 34.

Figure 14:
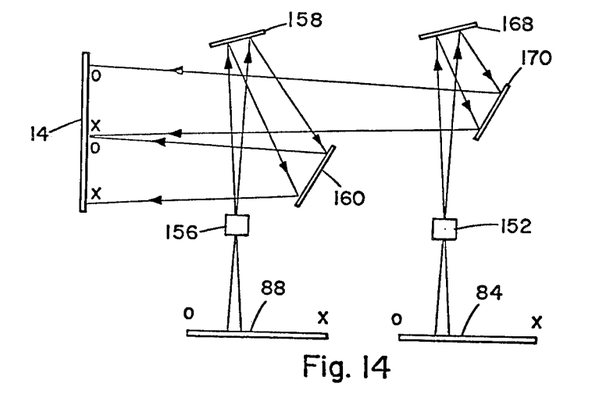
FIG. 14 is a diagram of an alternative optical system.

An alternative optical system, which may be desirable for some purposes, is shown in FIG. 14, in which both images are upright and move in a common direction. The optical path for the sample component is as described above, but the lens 152 over the master component 84 directs the light to a first mirror 168 and a second mirror 170 to provide an upright image. In either form the two optical paths are of equal length to ensure images of matching size.

The lenses are suspended from a supporting plate 174, or comparable structure, mounted in any suitable manner in casing 10. Lens 156, which is a mounted cylindrical unit of conventional type, slides vertically in a sleeve 176 fixed in plate 174, the lens extending through a mounting bar 178 and being pivotally attached thereto between lugs 180, as in FIGS. 8 and 9. One end of the mounting bar 178 is held on a threaded post 182 extending downwardly from plate 174 and biased away from the plate by a spring 184, a large adjustment nut 186 on the post below the mounting bar providing for vertical adjustment. The other end of mounting bar 178 is held on another threaded post 188 extending downwardly from plate 174 and spaced therefrom by a spring 190. Below the mounting bar is a pulley 192, which is threaded on post 188. Since the lens is guided and held in vertical axial alignment by sleeve 176 and pivotally attached to mounting bar 178, the bar need not be parallel to plate 174, and one or both ends can be adjusted as hereinafter described.

Figures 7, 8, 9, 10:
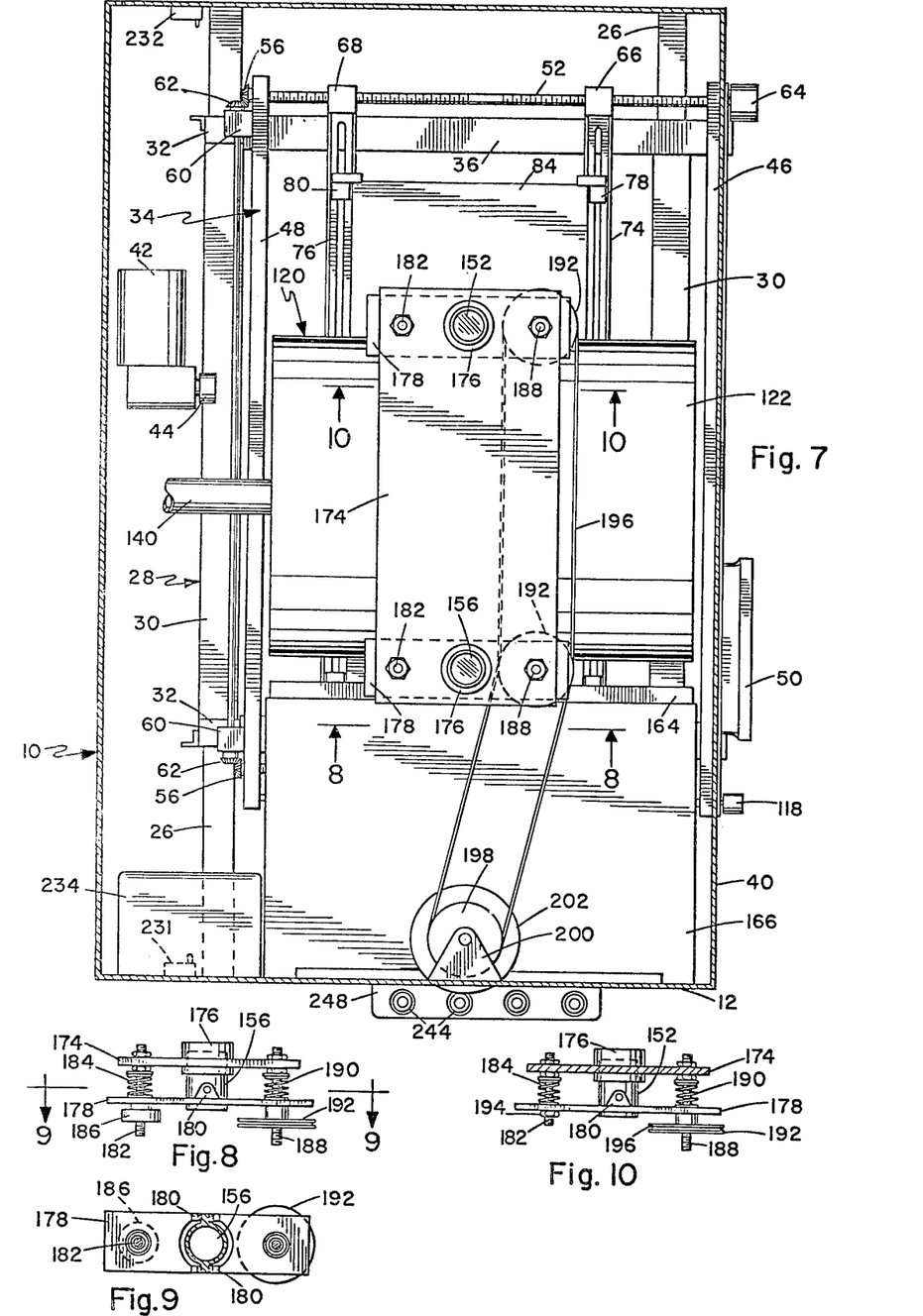
FIG. 7 is an enlarged sectional view taken on line 7—7 of FIG. 2.
FIG 8 is a sectional view taken on line 8—8 of FIG. 7.
FIG. 9 is a sectional view taken on line 9—9 of FIG. 8.
FIG. 10 is a sectional view taken on line 10—10 of FIG. 7.

The mounting of lens 152 shown in FIG. 10, is the same in all respects, except that the adjustment nut 186 is replaced by a lock nut 194, since adjustment at both ends is not necessary for both lens mountings.

Pulleys 192 are coupled together by an endless belt or cord 196, wrapped around the pulleys for positive drive, the cord extending to a control pulley 198 mounted on a bracket 200 on front panel 12. A focussing wheel 202, fixed to control pulley 198, protrudes through the front panel 12, so that the operator can turn the wheel and adjust the focus of both lenses equally. Adjustment nut 186 is used for initial adjustment to equalize image sizes and normally does not need to be changed once set.

Figure 12:
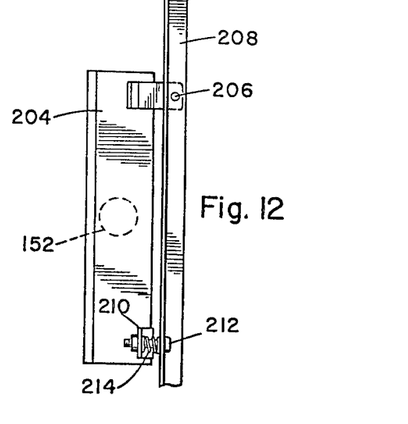
FIG. 12 is a sectional view taken on line 12—12 of FIG. 11.

In initially setting up the apparatus, it may be necessary to shift one image laterally for precise registration. To do this, mirror 154 is mounted in a frame 204, which has a pivotal connection 208 at one end to a support member 208 fixed in casing 10, as in FIGS. 11 and 12. On the other end of frame 204 is a bracket 210, an adjustment screw 212 being fitted through support member 208 and threaded into the bracket. A spring 214 between bracket 210 and support member 208 maintains the setting.

Longitudinal adjustment of the sample component to obtain proper registration of the images is made by positioning of the stop blocks 90 and 92 on their respective tracks. With a sample component in place, the final precise adjustment is made by turning knob 118, the spring fingers 100 allowing limited longitudinal movement of the sample component, while retaining a holding grip against the clamp blocks.

In the inspection of printed circuit boards it may be desirable to compare a sample board with a negative or transparency of the printed circuit layout. For this purpose, backlight lamps 216 are mounted under carriage 28, below the position of the normally illuminated portion of the master component, as in FIG. 11. A diffuser 218 is placed above the lamps for even lighting and the transparency is secured in the master component position. To shut off the light and heat from the lamp house, a shutter 220 is pivotally mounted in the rear portion of the lamp house, to swing up and close the open end, as in the broken line position. When not in use, the shutter serves as a portion of the secondary reflector 130, or could be made removable.

Figure 17:
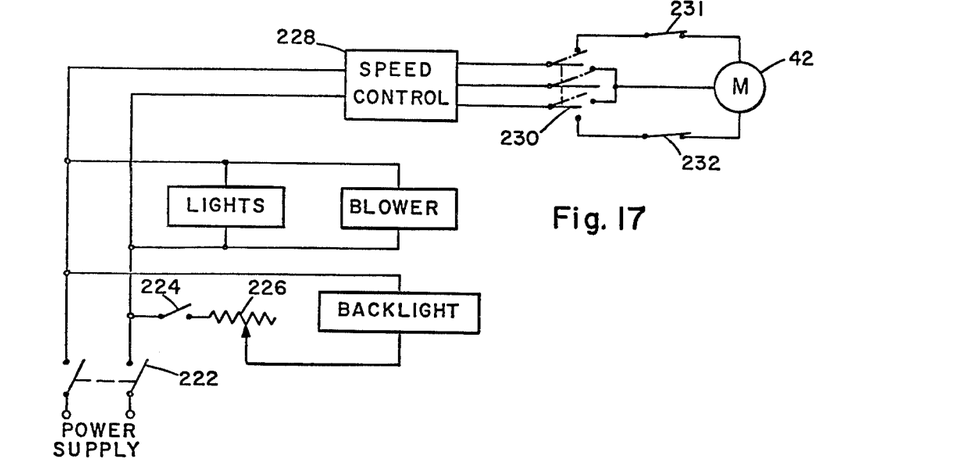
FIG. 17 is a basic wiring diagram of the comparator unit.

In the wiring diagram shown in FIG. 17, a power supply is connected through a main switch 222 to the lights and blower of the lamp house. The backlight circuit is separately controlled through a switch 224 and dimmer 226 for balancing the image intensities when used. Motor 42 is energized through a direct current speed control 228, such as a silicon controlled rectifier circuit of well known type, and has a reversing switch 230 with a center off position. Limit switches 231 and 232 are mounted in suitable positions in the casing to limit the travel of the carriage. The reversing switch and a knob 233 for the speed control are mounted on a recessed control panel 234 in front panel 12, and are shown positioned for convenient one handed operation. The main switch and the backlight controls can be at any convenient location.

Figure 15:
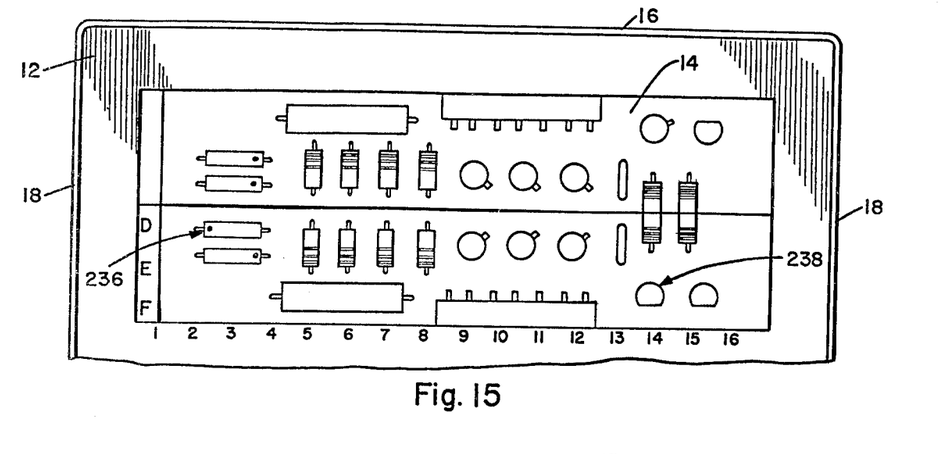
FIG. 15 is an enlarged view of the viewing screen, showing a typical image presentation.
Figure 16:
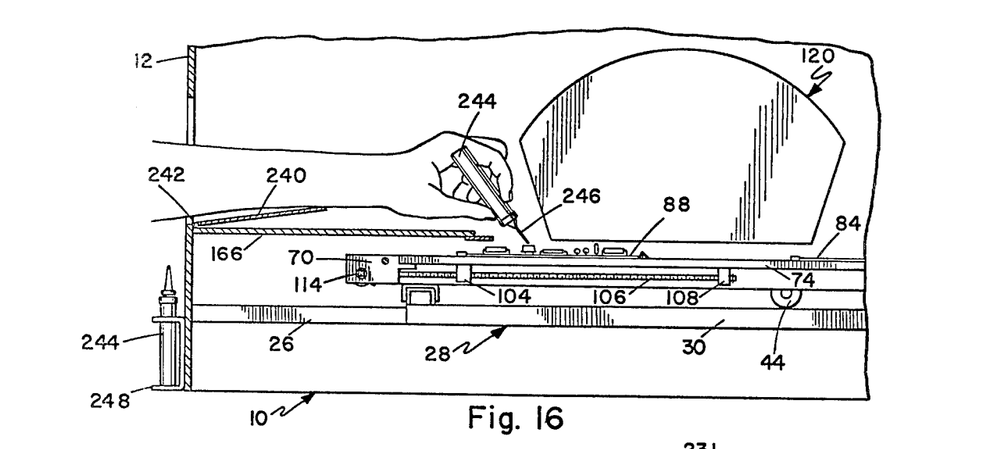
FIG. 16 is an enlarged sectional view taken on line 16—16 of FIG. 2, showing marking of a faulty element.

A typical image presentation is shown in FIG. 15 in which it can be seen that the sample in the lower image has a reversed polarity capacitor 236 and an incorrect transistor 238, when compared to the master. To facilitate marking the faulty elements, front panel 12 is provided with a large trap door 240 hinged at its lower edge by a spring loaded hinge 242 to swing inwardly and down on top of platform 166, the spring hinge holding the trap door closed. It has been found that marking is best done with a water based fluorescent ink dispensed from a squeeze type pen 244 with a long thin nozzle 246. The operator's arm is pushed through trap door 240, as in FIG. 16, and a drop of ink is placed on the faulty circuit element. Since the marking operation can be seen on the screen, the action is quick and simple and, with the effective cooling system, the operator is in no danger of being burned. If necessary the platform 186 can have a covering of thermal insulation of low reflectivity, such as black velvet or flocking.

Several pens 244, with different colored inks, are conveniently stored in a rack 248, mounted on front panel 12 below the trap door. To avoid clogging of the nozzle by dried ink, each pen has a cap 250 lined with resilient material 252, such as silicone rubber with a central socket 253 which is a tight fit for nozzle 246. When the cap is pushed over the nozzle, the air trapped in socket 253 forces the ink back down the nozzle by a pumping action and seals the nozzle to prevent clogging by dried ink.

Figure 21:
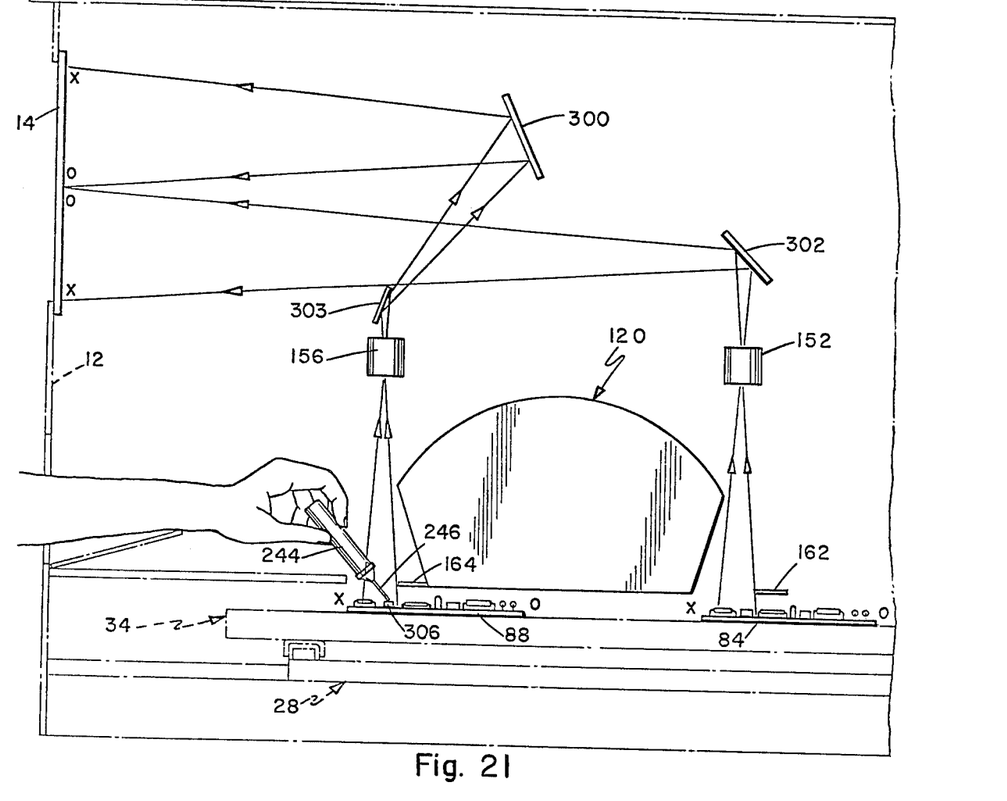
FIG. 21 is a view similar to FIG. 11, but showing an alternative optical system and the marking of a faulty component.
Figure 22:
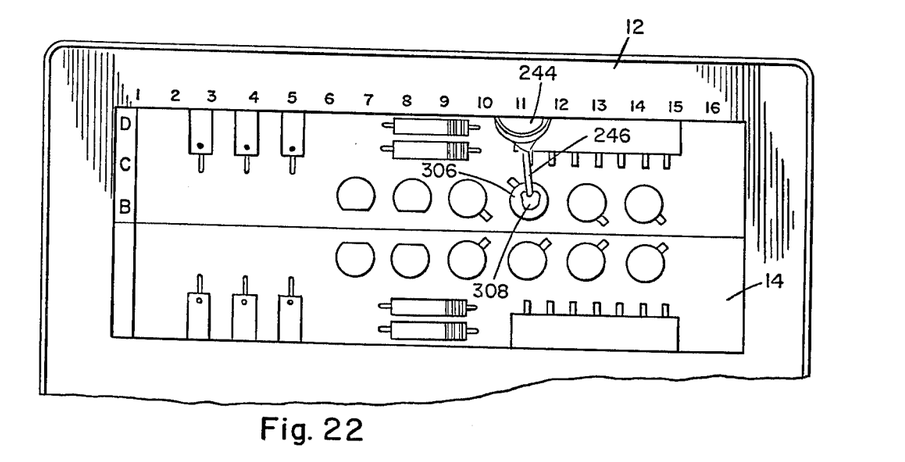
FIG. 22 is a front view of the viewing screen showing the image resulting from the arrangement of FIG. 21.

In another optical system, see FIG. 21, mirrors 303 and 300 direct the light image of component 88 to the upper portion of the screen 14. Mirror 302 directs the image of component 84 to the lower portion of the screen 14. Thus as the carriage 28 is moved, the two images provide an abutting merging mirror, image display of the illuminated portions of components 84 and 88. However the center edge of the forward component 88 is opposite the forward edge of the component. Thus it is possible to insert the market pen 244 into the display to mark the defective transistor 306 with market dye 308, without having the hand of the user obstruct the display, see FIG. 22.

Figure 2:
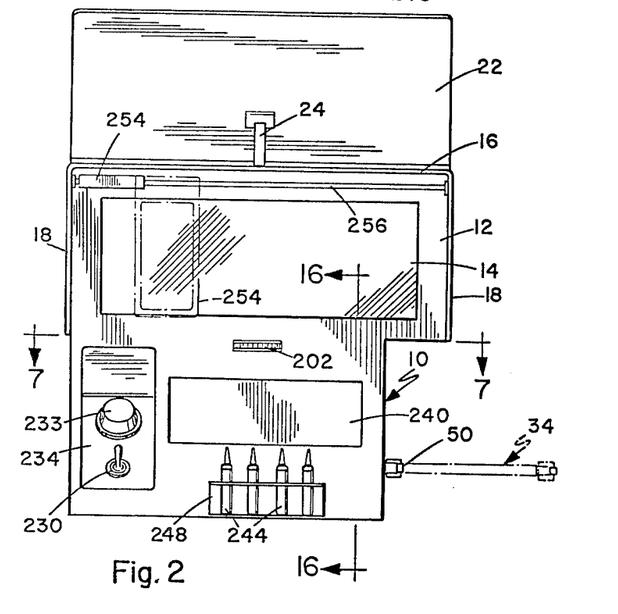
FIG. 2 is a front elevation view of the unit.
Figure 3:
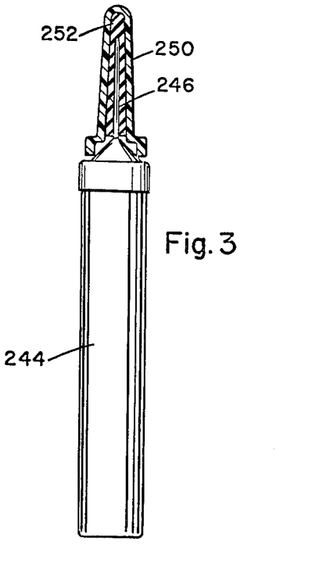
FIG. 3 is an enlarged view, partially in section, of a marker pen used with the unit.

For close inspection of small details, an inspection lens 254 is slidably mounted on a rod 256 extending across hood 16, the lens being hinged to swing upward clear of the screen when not in use, as in FIG. 2.

Figure 4:
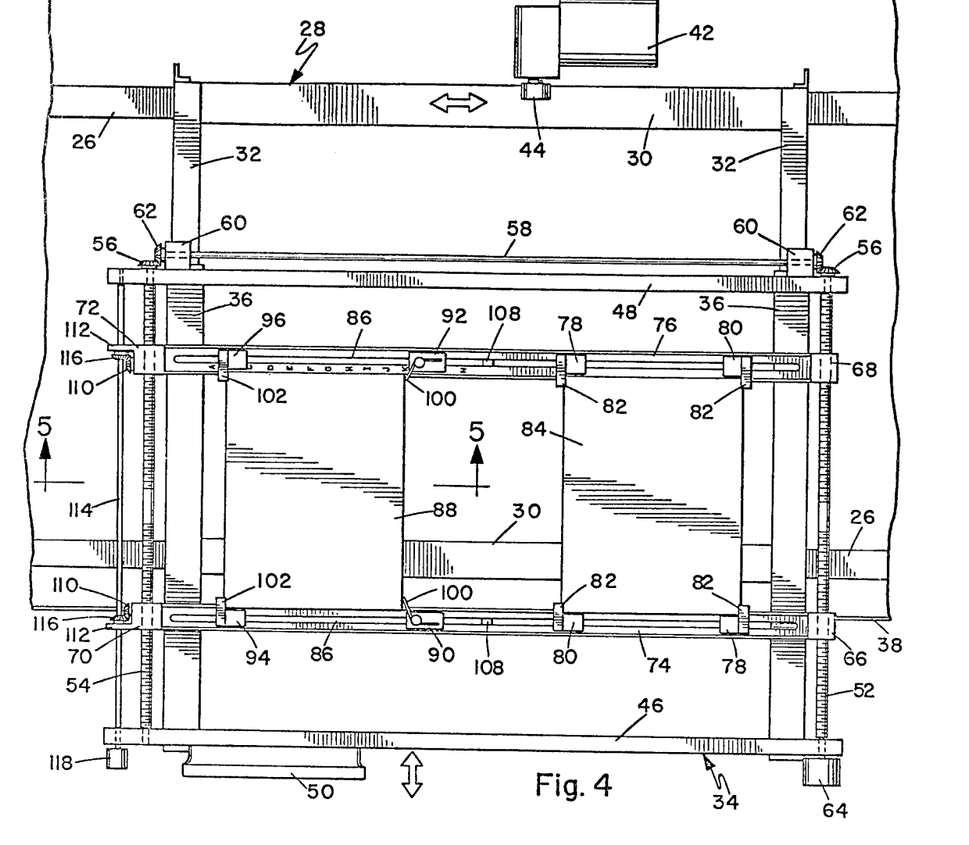
FIG. 4 is an enlarged sectional view taken on line 4—4 of FIG. 1.
Figure 18:
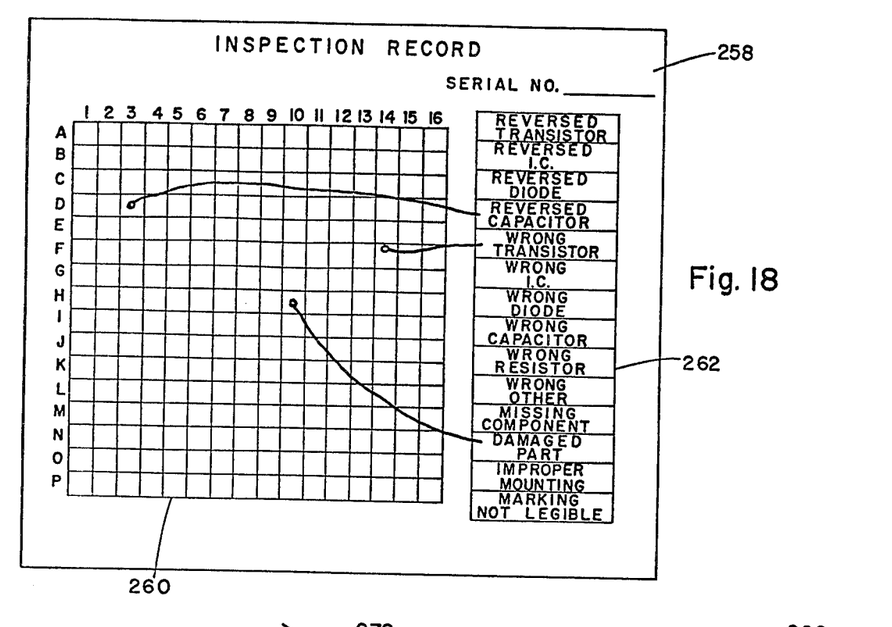
FIG. 18 is a view of a typical fault recording chart.
Figure 19:
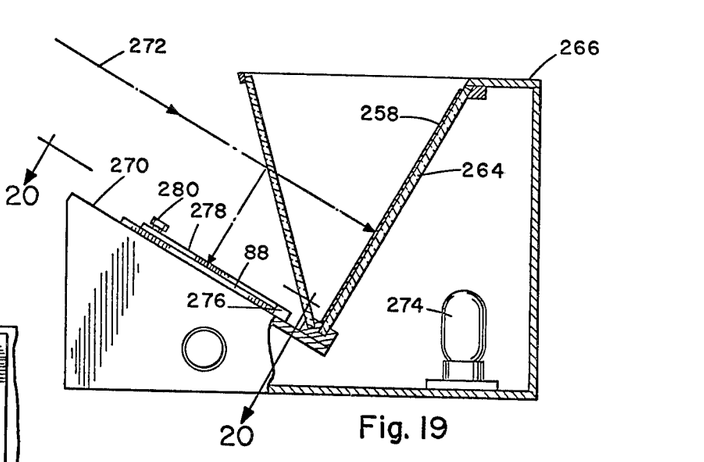
FIG. 19 is a side elevation view, partially cut away, of an inspection viewer to hold the chart and component.
Figure 20:
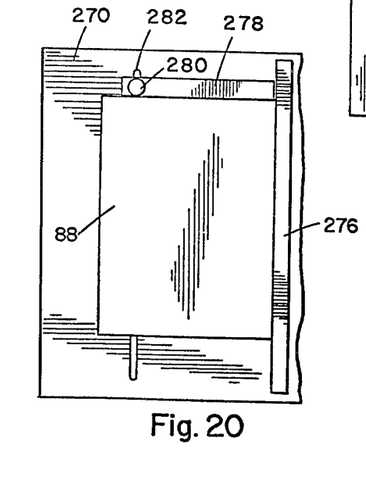
FIG. 20 is a view taken on line 20—20 of FIG. 19.

To make a complete inspection record and facilitate identification of faults, a grid system is used. The lower edge of screen 14 is numbered from left to right, as in FIG. 15, and vertical reference is provided by letters spaced along track 76, as shown in FIG. 4, so as to be visible in the image. A record is made on a printed form 258, with a grid 260 corresponding to the grid of the image. Thus the chart is marked at grid positions D3 and F14, to indicate the faulty elements. At the side of form 258 is a fault table 262 of typical faults, and a line is drawn from each marked position on the grid to the appropriate fault, as shown in FIG. 18, to facilitate later correction. The form 258 is scaled to the actual size of the grid in relation to the component itself, so that by superimposing the form on the component, the markings fall over the faulty elements. To simplify inspection, the form is placed on the backlighted window 264 of a viewer 266. Inclined forward of the window is a beam splitter mirror 268 and a platform 270 on which the faulty sample component is placed. From a suitable viewing direction, indicated by arrow 272 of FIG. 19, the composite images of the component and form are seen in the beam splitter mirror. Lamp 274 may be provided with a dimmer to balance the image intensities.

The faulty sample component 88 rests on a fixed stop 276 in vertical alignment with the form 258, lateral alignment being set by an adjustable stop 278 against one edge of the component. Stop 278 is held by a suitable clamp screw 280 through a transverse slot 282 in platform 270. By this means, a relatively unskilled operator can correctly identify faults, and a record of each component is provided.

When it is not desired to mark a component then the grid system can be used separately to indicate a fault. This allows the faults to be recorded even through the test procedure does not allow marking the components directly.

A single operator can set up the apparatus and inspect components quickly, the sample component being changed by pulling out the frame by handle 50, lifting out the sample just checked and inserting the next, then pushing in the frame. With components assembled, on a production basis, there should be little if any need for adjustment of the image each time a component is changed. Image motion is under full control of the operator and can be stopped instantly when a fault is detected, or for careful scrutiny. The adjustment means incorporated in the component carrying frame will accommodate a variety of types and sizes of printed circuit boards or other components.

Having described my invention, I now claim:

1. The method of making an optical comparison inspection of a master component and a sample component comprising the steps of:
    illuminating corresponding portions of the master component and the sample component to be inspected,
    moving both said master and said sample components relative to the illumination,
    projecting light images of corresponding illuminated portions,
    inverting one of said light images relative to the other of said light images,
    displaying said light images in edge-abutting relationship so that the images appear to converge or diverge from their common edge depending on the direction of movement of said components.

2. The method as claimed in claim 1 including the steps of,
    holding the master component and the sample component in a spaced relationship and in a substantially planar relationship.

3. The method as claimed in claim 1 including the steps of,
    marking a portion of the sample component with a marking element by viewing the display and guiding the movement of the marking element as shown in the display.

4. The method of making an optical comparison inspection of a master component and a sample component according to claim 1 further including the step of:
    reverting one of said light images relative to the other of said light images.

* * * * *